(12) United States Patent
Lee et al.

(10) Patent No.: US 7,952,866 B2
(45) Date of Patent: May 31, 2011

(54) PORTABLE COMPUTER

(76) Inventors: Seung Min Lee, Hanam-si (KR); Hyun Chung, Seoul (KR)

( * ) Notice: Subject to any disclaimer, the term of this patent is extended or adjusted under 35 U.S.C. 154(b) by 97 days.

(21) Appl. No.: 12/427,116

(22) Filed: Apr. 21, 2009

(65) Prior Publication Data

US 2010/0265646 A1  Oct. 21, 2010

(51) Int. Cl.
*G06F 1/16* (2006.01)
(52) U.S. Cl. ............. 361/679.55; 361/679.04; 345/1.1
(58) Field of Classification Search ............ 361/679.55, 361/679.04, 679.06; 345/1.1, 168
See application file for complete search history.

(56) References Cited

U.S. PATENT DOCUMENTS

| | | | |
|---|---|---|---|
| 6,222,507 B1 * | 4/2001 | Gouko ............................ 345/1.1 |
| 6,295,038 B1 * | 9/2001 | Rebeske ......................... 345/1.1 |
| 6,643,124 B1 * | 11/2003 | Wilk ........................ 361/679.04 |
| 6,667,878 B2 * | 12/2003 | Ponx ........................ 361/679.04 |
| 6,859,219 B1 * | 2/2005 | Sall ................................ 345/1.1 |
| 6,909,597 B2 * | 6/2005 | Tutikawa ................. 361/679.04 |
| 7,061,472 B1 * | 6/2006 | Schweizer et al. ............ 345/168 |
| 7,136,282 B1 * | 11/2006 | Rebeske ................... 361/679.55 |
| 7,466,306 B2 * | 12/2008 | Connor et al. ................. 345/169 |
| 7,525,511 B2 * | 4/2009 | Baudisch ....................... 345/1.3 |
| 7,633,744 B2 * | 12/2009 | Kuhn ........................ 361/679.04 |
| 2001/0054986 A1 * | 12/2001 | Leman .......................... 345/1.1 |
| 2002/0109662 A1 * | 8/2002 | Miller ........................... 345/100 |
| 2002/0135535 A1 * | 9/2002 | Muller ........................... 345/1.1 |
| 2002/0141146 A1 * | 10/2002 | Mustoe ......................... 361/683 |
| 2003/0043087 A1 * | 3/2003 | Kim ............................... 345/1.1 |
| 2003/0161094 A1 * | 8/2003 | Chambers ..................... 361/681 |
| 2004/0051679 A1 * | 3/2004 | Ponx .............................. 345/1.1 |
| 2004/0160736 A1 * | 8/2004 | Lin ................................ 361/683 |
| 2005/0134524 A1 * | 6/2005 | Parker et al. .................. 345/1.1 |
| 2005/0253775 A1 * | 11/2005 | Stewart ......................... 345/1.1 |
| 2006/0082518 A1 * | 4/2006 | Ram .............................. 345/1.1 |
| 2006/0126284 A1 * | 6/2006 | Moscovitch .................. 361/681 |
| 2006/0214871 A1 * | 9/2006 | Iwamura ....................... 345/1.1 |
| 2007/0127196 A1 * | 6/2007 | King ............................. 361/681 |
| 2007/0153456 A1 * | 7/2007 | Lin ............................... 361/681 |
| 2007/0247798 A1 * | 10/2007 | Scott, II ........................ 361/683 |
| 2008/0024388 A1 * | 1/2008 | Bruce ........................... 345/1.1 |
| 2008/0062625 A1 * | 3/2008 | Batio ............................ 361/680 |
| 2009/0102744 A1 * | 4/2009 | Ram .............................. 345/1.1 |
| 2009/0273539 A1 * | 11/2009 | Pruett ............................ 345/1.1 |
| 2010/0157518 A1 * | 6/2010 | Ladouceur et al. ...... 361/679.09 |

FOREIGN PATENT DOCUMENTS

| KR | 10-2000-0024658 A | 6/2000 |
| KR | 10-2006-0027273 A | 3/2006 |
| KR | 10-2006-120241 A | 11/2006 |

* cited by examiner

*Primary Examiner* — Lisa Lea-Edmonds
(74) *Attorney, Agent, or Firm* — Kile PArk Goekjian Reed & McManus PLLC

(57) ABSTRACT

The present invention relates to a portable computer comprising a main body unit which forms an image signal by reading and processing data; and a display unit which is plurally provided and has a plate surface displaying an image thereon and overlapping each other to rotate with respect to the main body casing, is detachably mounted in the display supporter, displays an image only on a most front plate surface when mounted in the display supporter, receives an image signal of the most front plate surface and selectively displays a same or different images thereon if it is separated from the display supporter.

Accordingly, applicability and convenience of the portable computer may improve.

5 Claims, 4 Drawing Sheets

PORTABLE COMPUTER

BACKGROUND OF THE INVENTION

1. Field of the Invention

Apparatuses consistent with the present invention relate to a portable computer, and more particularly, to a portable computer which employs a plurality of display units.

2. Description of the Related Art

A portable computer employs small-size, light-weight technology in consideration of mobility and convenience, and a user may use the portable computer regardless of places. The portable computer includes a main body unit which processes digital data, and a display unit which is electrically connected to the main body unit and displays thereon an image by an image signal generated by the main body unit.

Due to its small-size, the portable computer only employs necessary functions to the minimum. Thus, only one display unit is rotatably coupled with the main body unit. As a result, it is difficult for the portable computer to employ a dual monitor function applying to a desk top computer. The dual monitor function is realized by two monitors, which are connected to a computer main body in a wired manner. Accordingly, the configuration of the computer main body should change depending on the number of monitors, and a problem arises in the configuration and operation of the portable computer in consideration of the characters of the portable computer which takes mobility seriously if the known dual monitor function is employed.

Therefore, it would be preferable if the portable computer overcomes the foregoing problem and employs a plurality of display units.

Furthermore, it would be more preferable if a lead wire, which transmits an electrical signal, is excluded to employ a plurality of display units to the portable computer.

SUMMARY OF THE INVENTION

Accordingly, it is an aspect of the present invention to provide a portable computer which employs a plurality of display units and selectively realizes various images.

Also, it is another aspect of the present invention to provide a portable computer which employs a plurality of display units without damaging mobility.

Additional aspects and/or advantages of the present invention will be set forth in part in the description which follows and, in part, will be obvious from the description, or may be learned by practice of the present invention.

The foregoing and/or other aspects of the present invention are also achieved by providing a portable computer comprising a main body unit which forms an image signal by reading and processing data, and comprises a main body casing and a display supporter spaced from and electrically connected to the main body casing; and a display unit which is plurally provided and has a plate surface displaying an image thereon and overlapping each other to rotate with respect to the main body casing, is detachably mounted in the display supporter, displays an image only on a most front plate surface when mounted in the display supporter, receives an image signal of the most front plate surface and selectively displays a same or different images thereon if it is separated from the display supporter.

Preferably, the display units receive an image signal in a wireless manner from the main body unit.

Preferably, the most front display unit of the plurality of display units displays an image thereon when the plurality of display units overlaps each other and is mounted in the main body unit.

Preferably, the main body unit comprises a main body power unit to supply power and a display supporter which is electrically connected to the main body power unit and includes a supporting groove to mount therein and support the display unit, wherein the display units comprises a display power unit to receive and store power from the main body power unit if mounted in the display supporter.

Preferably, the display power unit comprises a solar storage unit to generate power from solar heat.

Preferably, the display units further comprises a displaying part which visually identifies one of the plurality of display units from the remaining display units.

BRIEF DESCRIPTION OF THE DRAWINGS

The above and/or other aspects of the present invention will become apparent and more readily appreciated from the following description of the embodiments, taken in conjunction with the accompanying drawings of which.

DETAILED DESCRIPTION OF EXEMPLARY EMBODIMENT

Hereinafter, exemplary embodiments of the present invention will be described with reference to accompanying drawings, wherein like numerals refer to like elements and repetitive descriptions will be avoided as necessary.

Figure 1:
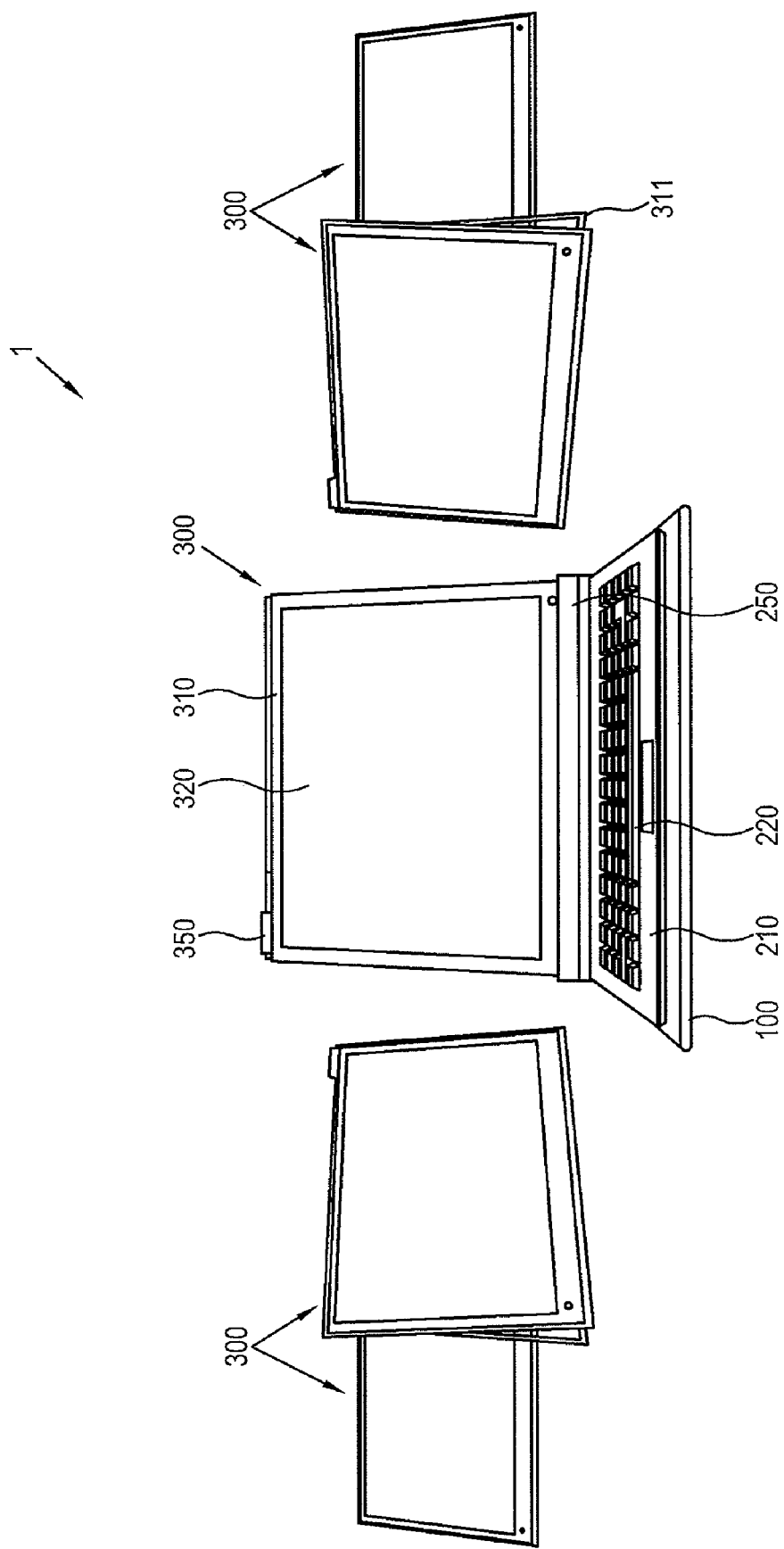
FIG. 1 is a partial exploded perspective view of a plurality of display units of a portable computer according to the present invention.
Figure 2:
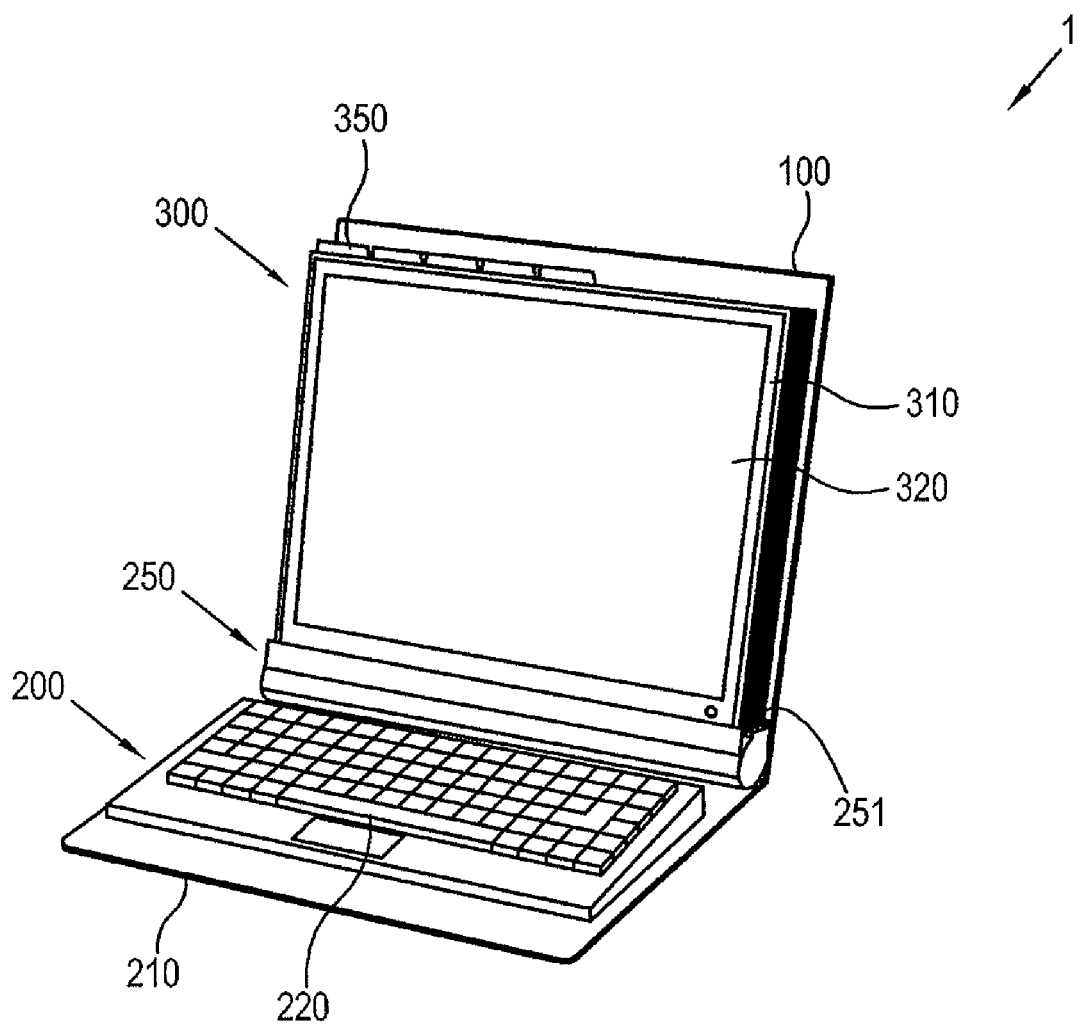
FIG. 2 is a perspective view of a plurality of display units which is mounted in a main body unit of the portable computer in FIG. 1.
Figure 3:
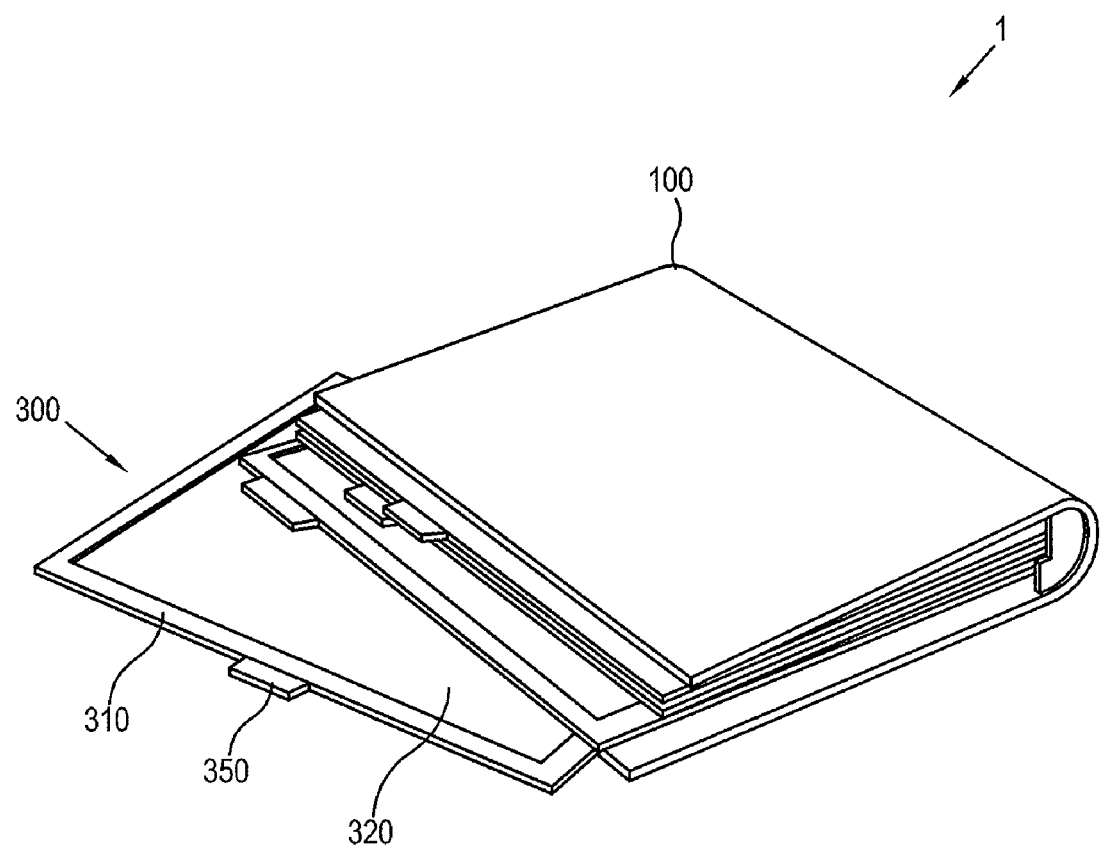
FIG. 3 is a perspective view of the portable computer in FIG. 1 to which a pouch is folded.
Figure 4:
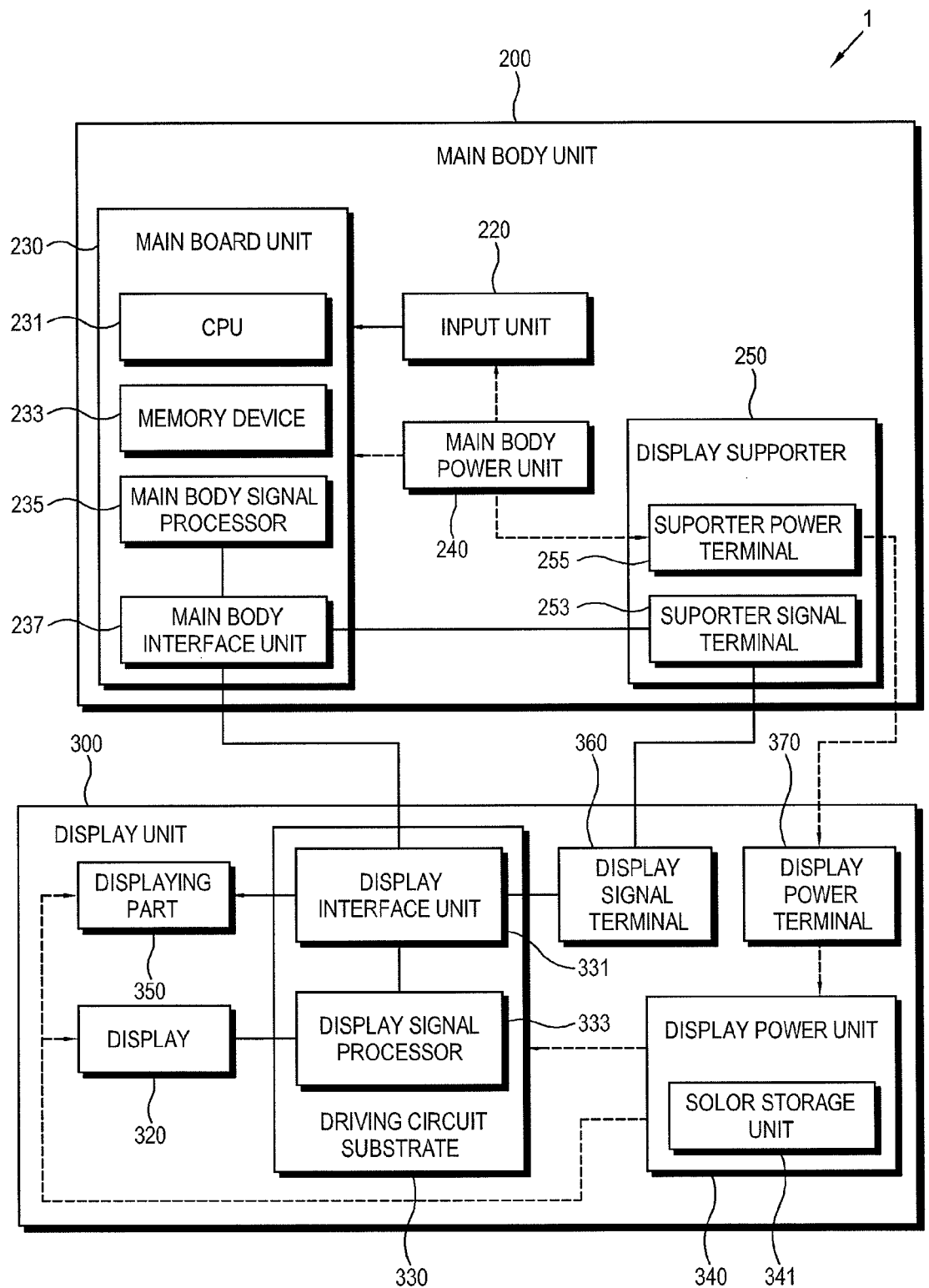
FIG. 4 is a block diagram of the main body unit and one of the display units of the portable computer in FIG. 1.

Hereinafter, among lines which connect respective elements in FIG. 4, the straight line refers to a transmission of image signals while the dotted line refers to power supply.

As shown in FIGS. 1 to 4, a portable computer 1 according to the present invention includes a pouch 100, a main body unit 200 which is supported by an internal side of the pouch 100 and a plurality of display units 300 which is detachably attached to the main body unit 200.

The pouch 100 is provided to be folded with a central area having a predetermined curvature, and the main body unit 200 is supported by an internal plate surface of the pouch 100. The central area of the pouch 100 is coupled with a display supporter 250 (to be described later). The pouch 100 is folded, centering on the display supporter 250, to thereby protect the main body unit 200, the display supporter 250 and the plurality of display units 300 from the outside. To support this function, the pouch 100 may include a shock-absorbing material, e.g., artificial leather, resin, etc.

The main body unit 200 and the display supporter 250 are detachably attached to the pouch 100, which may be replaced by others in various colors and designs for user's preference. The pouch 100 may further include a fixing unit (not shown) so as not to be unfolded voluntarily while being folded.

The main body unit 200 stores, reads, computes and processes data, and processes data and generates an image signal to display an image on a display 320. The main body unit 200 includes a main body casing 210; an input unit 220 which is provided in an upper plate surface of the main body casing 210; a main board unit 230 which is accommodated in and supported by the main body casing 210; a main body power unit 240 which supplies power to sub elements of the main body unit 220 such as the main board unit 230; and the display supporter 250 which is spaced from the main body casing 210.

The main body casing 210 is shaped like a rectangular plate, whose rear surface is contacted with the pouch 100. The main body casing 210 accommodates and supports general elements of the main body unit 200. An auxiliary input unit (not shown) and an auxiliary output unit (not shown), which include various input/output terminals such as a camera and a speaker are installed in an external side of the main body casing 210 to thereby extend functions of the portable computer 1.

Preferably, the upper plate surface of the main body casing 210 having the input unit 220 is downwardly inclined for a user to access the portable computer 1 without difficulty. The main body casing 210 preferably includes a conductive material such as aluminum to discharge heat generated by the elements accommodated therein, to the outside. Thus, the elements which are accommodated in the main body casing 210 may be protected from heat.

The input unit 220 is provided in the upper plate surface of the main body casing 210 and is electrically connected to the main board unit 230. The input unit 220 employs an input device for a known computer interface such as a keyboard, a mouse track ball, a touch pad and a joy stick. Thus, the data processing can be accomplished by a user's voluntarily executing an operating system and an application to process data.

The main board unit 230 is provided by various chips and parts that are mounted on a printed circuit board (PCB) A central processing unit (CPU) 231 and a memory device 233 are mounted in the main board unit 230 to read and process inputted or stored digital data, and output such digital data in various ways for a user. The main board unit 230 controls an operation of the portable computer 1.

The main board unit 230 realizes a software virtual space, and executes the operating system and an application operating in the operating system to thereby process data.

The main board unit 230 includes a main body signal processor 235 which generates an image signal, and a main body interface unit 237 which transmits an image signal generated by the main body signal processor 235 to the display 320. Then, a data processing which occurs in the virtual space of the main board unit 230 is displayed as an image on the display 320.

The main board unit 230 is electrically connected to the display supporter 250. When the display unit 300 is mounted in the display supporter 250, an image signal may be transmitted to the display 320 through the display supporter 250.

The CPU 231 is mounted in the main board unit 230 and controls data processing and operations of general elements of the portable computer 1.

The memory device 233 includes a main memory device (not shown) including a random access memory (RAM); and an auxiliary memory device (not shown) including a hard disc drive (HDD) and an optical disc drive. The memory device 233 stores an operating system in the auxiliary memory device to operate the portable computer 1. The operating system may include one of various known operating systems including Windows series of Microsoft such as Windows XP and VISTA, Mac OS series of Apple, UNIX or Linux.

The memory device 233 provides a software virtual space formed by the main board unit 230, and the operating system in the virtual space operates and processes data.

The main body signal processor 235 includes a graphic chip or a graphic option board which is mounted in the main board unit 230. The main body signal processor 235 processes data into an image signal to be transmitted to the main body interface unit 237.

The main body interface unit 237 transmits the image signal from the main body signal processor 235 to the display 320. The main body interface unit 237 selectively transmits an image signal in a wireless manner to each of the plurality of display units 300 separated from the display supporter 250. Then, the plurality of display units 300 displays the same image or different images thereon.

The main body interface unit 237 is electrically connected with the display supporter 250. If the display units 300 are mounted in the display supporter 250, an image signal does not need to be transmitted wirelessly since the display units 300 are connected through the display supporter 250 in a wired manner. Thus, the main body interface unit 237 may transmit the image signal to the display units 300 through the display supporter 250.

The main body interface unit 237 displays an image only on a display unit 300 which is the most front to a user when the plurality of display units 300 overlaps each other and is mounted in the display supporter 250. The remaining display units 300, except for the most front one, have image display areas that are covered, and do not need to display an image thereon. Here, if one of the remaining display units 300 is separated from the display supporter 250, the main body interface unit 237 transmits an image signal to the separated display unit 300 to display an image thereon.

The main body interface unit 237 is electrically connected with the memory device 233 to thereby transmit data stored in the memory device 233 to the main body unit 200 of another portable computer 1. The main body interface unit 237 may transmit data of the memory device 233 to the portable computer 1 having the display unit 300 if the display unit 300 separated from the display supporter 250 is mounted in the display supporter 250 of another portable computer 1.

The main body power unit 240 supplies power to sub elements of the main body unit 200 such as the input unit 220, the main board unit 230, etc. The main body power unit 240 includes a storage battery, and receives power from an external power source to store the power. Thus, a user may use the portable computer 1 while external power is cut off. A power storing function of the main body power unit 240 deteriorates as time elapses. Thus, the main body power unit 240 is preferably detachable from the main body casing 210 so as to be replaced by others.

The main body power unit 240 may be electrically connected to the display supporter 250, and supply power to the display power unit 340 (to be described later) when the display 320 is mounted in the display supporter 250.

The display supporter 250 is provided in the central area of the pouch 100 spaced from the main body casing 210. The display supporter 250 is electrically connected with the main board unit 230 and the main body power unit 240. The display supporter 250 extends to the main body casing 210 and the plurality of display units 300 is mounted in the extension direction. When the pouch 100 is open, the display supporter 250 vertically supports the mounted display unit 300 from the plate surface of the pouch 100 or supports the mounted display unit 300 to be inclined at predetermined angles from the vertical direction. Thus, a user may easily acknowledge an image displayed on the display units 300.

The display supporter 250 includes a supporting groove 251 which is formed in the lengthwise direction of the display supporter 250; a supporter signal terminal 253 which is provided in a part of the supporting groove 251 corresponding to the plurality of display units 300; and a supporter power terminal 255.

The supporting groove 251 accommodates therein a lower side of the display units 300 to be mounted in and supported by the display supporter 250. The supporting groove 251 is provided to correspond to the number of the display units 300 to individually attach and detach the display units 300. The supporting groove 251 may include an additional fixing device (not shown) to support the mounting position of the display units 300.

The supporter signal terminal 253 is electrically connected with the main board unit 230. The supporter signal terminal 253 is electrically connected with a driving circuit substrate 330 (to be described later) when the display units 300 are accommodated in the supporting groove 251. Thus, the main body interface unit 237 may transmit an image signal to the display units 300 in a wired manner.

The supporter power terminal 255 is electrically connected with the main body power unit 240. The supporter power terminal 255 is electrically connected with the display power unit 340 (to be described later) when the display units 300 are accommodated in the supporting groove 251. Then, power is supplied from the main body power unit 240 to the display power unit 340.

The display units 300 display an image thereon by receiving an image signal from the main body unit 200 in a wireless/wired manner. The display units 300 are plurally provided and detachable from the main body unit 200. In the portable computer 1 according to the exemplary embodiment of the present invention, five display units 300 are provided, but not limited thereto.

Plate surfaces of the display units 300 which display an image thereon overlap each other when the plurality of display units 300 is mounted in the display supporter 250. That is, one of the plurality of display units 300 is mounted to direct its image display area to a user while the remaining display units 300 are sequentially mounted in the rear surface of the display units 300. Then, a user may view an image displayed only on the most front display unit 300.

The display units 300 should be small and thin for the foregoing function, and may employ a known technology such as an organic light emitting diode (OLED). The OLED is an organic material that emits light by itself by using electric field light emission occurring when current flows in a fluorescent organic compound. With the OLED application, the display units 300 may become small and thin.

The display units 300 may additionally include a power button (not shown) to turn on/off power or include software so that a user may turn on or off power from the operating system of the main body unit 200. Otherwise, if the plurality of display units 300 is mounted in the display supporter 250, the remaining display units 300, except for the most front one, are turned off while the display unit 300 which is separated from the display supporter 250 may be automatically turned off. This may be changed in various ways within the spirit of the present invention.

The display units 300 include a display casing 310; a display 320 which is accommodated in the display casing 310 and displays an image thereon; a driving circuit substrate 330 which drives the display 320; a display power unit 340 which supplies driving power to general elements of the display units 300; a displaying part 350 which projects from an upper side of the display casing 310; a display signal terminal 360 which is provided in a lower side of the display casing 310; and a display power terminal 370.

The display casing 310 is shaped like a small, thin rectangular plate to accommodate therein general elements of the display units 300. The display casing 310 includes an opening (not shown) on a front plate surface, and thus a user may view an image displayed on the display 320. The display casing 310 includes a supporter 311 which supports on a predetermined installation surface the display unit 300 separated from the display supporter 250.

The display 320 displays an image on a plate surface thereof by the driving circuit substrate 330, which receives and processes the image signal. The configuration of the display 320 is not limited, but may employ a known technology such as a liquid crystal display (LCD) so as to realize small, thin display units 300.

The driving circuit substrate 330 is accommodated in and supported by the display casing 310 in the rear surface of the display 320. The driving circuit substrate 330 receives and processes an image signal to drive the display 320 to thereby display an image on the display 320 by the image signal.

The driving circuit substrate 330 includes an additional memory (not shown) which stores therein firmware. The firmware performs a logical control of the driving circuit substrate 330 and includes inherent information of the display units 300. As the main board unit 230 acknowledges the inherent information, one of the plurality display units 300 may be identified from the remaining display units 300.

The driving circuit substrate 330 includes a display interface unit 331 which receives an image signal; and a display signal processor 333 which processes an image signal transmitted by the display interface unit 331 to display an image on the display 320.

The display interface unit 331 receives an image signal transmitted wirelessly from the main body interface unit 237 when the display units 300 are separated from the display supporter 250. The display interface unit 331 may receive an image signal transmitted by the supporter signal terminal 253 when the display units 300 are mounted in the display supporter 250.

The display signal processor 333 processes an image signal received by the display interface unit 331 to display an image on the display 320.

The display power unit 340 supplies driving power to general elements of the display units 300 such as the display 320 and the driving circuit substrate 330. The display power unit 340 includes a storage battery, and the display units 300 may be separated from the display supporter 250 to be used.

The display power unit 340 may store power in various ways. Two methods apply to the exemplary embodiment of the present invention. As one of the foregoing methods, if the display units 300 are mounted in the display supporter 250, the display power unit 340 is electrically connected with the main body power unit 240 through the supporter power terminal 255. Then, while the display units 300 are mounted in the display supporter 250, the display power unit 340 receives and stores power from the main body power unit 240.

In another method to store power, the display power unit 340 includes a solar storage unit 341 which generates power by solar heat. The solar storage unit 341 generates power by solar heat while the display units 300 are under the sunlight, and the display power unit 340 stores the power.

The displaying part 350 projects from the upper part of the display casing 310. The displaying part 350 allows one of the plurality of display units 300 to be identified from the remaining display units 300. The displaying part 350 includes a light emitter such as a light emitting diode (LED). Here, the displaying part 350 which is provided in each of the plurality of display units 300 emits light in different colors to thereby efficiently identify the respective display units 300.

The displaying part 350 preferably emits light when the display 320 displays an image thereon, and does not emit light when the image is not displayed on the display 320. Then, among the plurality of display units 300, a user may easily acknowledge the display unit 300 that displays an image thereon.

Preferably, the installation position of the displaying part 350 is ununiform to the plurality of other display units 300. That is, if the plurality of display units 300 is all mounted in the display supporter 250, the displaying part 350 of the display units 300 crosses each other for a user to check the displaying part 350. Then, when a user desires to separate one display unit 300 from the display supporter 250, he/she may pull the concerned displaying part 350 to thereby easily separate the display unit 300.

The display signal terminal 360 is installed in a lower side of the display casing 310 corresponding to the supporter signal terminal 253. If the display units 300 are mounted in the display supporter 250, the display signal terminal 360 electrically contacts the supporter signal terminal 253. Then, the main body interface unit 237 and the display interface unit 331 are connected with each other in a wired manner to transmit an image signal.

The display power terminal 370 is installed in a lower side of the display casing 310 corresponding to the supporter power terminal 255. If the display units 300 are mounted in the display supporter 250, the display power terminal 370 electrically contacts the supporter power terminal 255. Then, the main body power unit 240 is electrically connected with the display power unit 340, which may receive and store power from the main body power unit 240.

With the foregoing configuration, the operation of the portable computer 1 according to the present invention will be described with reference to FIGS. 1 to 4. Here, the plurality of display units 300 is all mounted in the display supporter 250, and the folded state of the pouch 100 is called an initial state.

If the pouch 100 is open, the plurality of display units 300 stands upwards while folded. If the main body unit 200 is turned on, the software virtual space is realized in the main board unit 230 by the memory device 233, and the stored operating system operates in the virtual space.

The operating system is provided on the basis of a graphic user interface (GUI), and various objects such as a shell of the operating system, an application and data are formed as an image. Then, the main body signal processor 235 generates an image signal to be transmitted to the main body interface unit 237.

As all of the display units 300 are mounted in the display supporter 250, the image signal is transmitted from the main body interface unit 237 to the supporter signal terminal 253 of the most front display unit 300 contacting the display signal terminal 360 of the display supporter 250.

The image signal is transmitted to the display interface unit 331 through the supporter signal terminal 253 and the display signal terminal 360. The display signal processor 333 processes the image signal to display an image on the display 320.

Here, the display power unit 340 is electrically connected with the main body power unit 240 by the display power terminal 370 and the supporter power terminal 255. As the display power unit 340 receives and stores power from the main body power unit 240, the display units 300 may be used while being separated from the display supporter 250.

Meanwhile, the remaining display units 300, except for the most front display unit 300, are separated from the display supporter 250 and supported on an installation surface by the supporter 311. If the plurality of display units 300 is controlled to display an image thereon in the operating system, the main body signal processor 235 generates an image signal to be transmitted to the display units 300 through the main body interface unit 237.

The main body interface unit 237 distributes and transmits signals to the respective display units 300. In case of the display units 300 mounted in the display supporter 250, an image signal is transmitted to the display interface unit 331 through the supporter signal terminal 253 and the display signal terminal 360 as described above. As for the display unit 300 separated from the display supporter 250, an image signal is transmitted from the main body interface unit 237 to the display interface unit 331 by a wireless network.

Then, the respective display units 300 selectively display different images or the same image thereon.

If the plurality of display units 300 displays different images thereon, a user divides an image with respect to a plurality of objects for each display unit 300 to display the image on the display units 300. Thus, a multi-tasking, i.e., various actions with respect to the plurality of objects are available, and convenience and applicability may improve.

If the plurality of display units 300 displays the same image thereon, the display units 300 are distributed to a plurality of people to be used for a presentation, etc.

The display unit 300 which is separated from the display supporter 250 receives driving power from the display power unit 340. Here, the solar storage unit 341 operates and generates power from the solar heat to supplement the driving power of the display units 300.

If the display units 300 which display an image with objects by predetermined data are mounted in other main body units 200, the data may be transmitted to the other main body units 200. Various methods are applicable to realize such transmission.

For example, the display units 300 include an additional memory device (not shown), and data which is the base for the object displayed as an image on the display units 300 may be stored in the memory device. In this case, the memory device is connected with the display signal terminal 360, and the data are transmitted to the main body interface unit 237 from the memory device through the supporter signal terminal 253 if the display unit 300 is mounted in the other main body unit 200.

As another example, if the display unit 300 which realizes an image of objects by data is mounted in another main body unit 200, the other main body unit 200 reads inherent information such as firmware included in the display unit 300 that is mounted. Thus, a networking path may be formed between the main body unit 200 including the display units 300, and the main body interface unit 237. The other main body unit 200 which is mounted with the display units 300 receives data from the main body unit 200 including the display units 300 through the networking path.

As described above, the configuration of the plurality of display units 300 with respect to the main body unit 200 may enhance applicability of the portable computer 1.

The foregoing configuration is realized by a wireless networking, and a wired connection by lead wires may be avoided.

As described above, a portable computer according to the present invention realizes an optional image by a plurality of displays and improves applicability and convenience.

Also, a portable computer according to the present invention enables application of a plurality of displays through a simple configuration and improves user's accessibility.

Further, the portable computer according to the present invention reduces consumption of office supply such as paper used for a presentation, is eco-friendly and reduces energy consumption.

Further, the portable computer according to the present invention realizes a design different from a conventional portable computer and meets user's various preferences.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A portable computer comprising:
a main body unit which forms an image signal by reading and processing data, and comprises a main body casing and a display supporter spaced from and electrically connected to the main body casing;
a display unit which is plurally provided and has a plate surface displaying an image thereon and overlapping each other to rotate with respect to the main body casing, is detachably mounted in the display supporter, displays an image only on a most front plate surface when mounted in the display supporter, receives an image signal of the most front plate surface and selectively displays a same or different images thereon if it is separated from the display supporter; and
a pouch which supports the main body unit and the display unit, wherein the display supporter is provided in a central area of the pouch, and the display unit rotates from a closing position where the pouch is closed so that a plate surface displaying an image thereon is not seen, to an opening position where the plate surface displaying the image thereon is seen while the plate surface displaying the image thereon overlaps in the same direction with respect to the main body casing,
wherein the display unit is provided to receive an image signal in a wireless manner from the main body unit.

2. A portable computer comprising:
a main body unit which forms an image signal by reading and processing data, and comprises a main body casing and a display supporter spaced from and electrically connected to the main body casing;
a display unit which is plurally provided and has a plate surface displaying an image thereon and overlapping each other to rotate with respect to the main body casing, is detachably mounted in the display supporter, displays an image only on a most front plate surface when mounted in the display supporter, receives an image signal of the most front plate surface and selectively displays a same or different images thereon if it is separated from the display supporter; and
a pouch which supports the main body unit and the display unit, wherein the display supporter is provided in a central area of the pouch, and the display unit rotates from a closing position where the pouch is closed so that a plate surface displaying an image thereon is not seen, to an opening position where the plate surface displaying the image thereon is seen while the plate surface displaying the image thereon overlaps in the same direction with respect to the main body casing.

3. The portable computer according to claim 2, wherein the main body unit comprises a main body power unit which supplies power,
the display supporter is electrically connected to the main body power unit, and comprises a supporting groove by which the display unit is mounted and supported; and
the display unit comprises a display power unit which receives and stores power from the main body power unit when mounted in the display supporter.

4. The portable computer according to claim 3, wherein the display power unit comprises a solar storage unit which generates power from solar heat.

5. The portable computer according to claim 2, wherein the display unit further comprises a displaying part which visually identifies one of the plurality of display units from the remaining display units.

* * * * *